United States Patent
Killeen et al.

(10) Patent No.: US 12,434,613 B2
(45) Date of Patent: Oct. 7, 2025

(54) APPARATUS, SYSTEM, AND METHOD FOR VEHICLE CUP HOLDER WITH INTEGRATED GRATE AND DRIP TRAY

(71) Applicant: Toyota Motor Engineering & Manufacturing North America, Inc., Plano, TX (US)

(72) Inventors: Matthew K. Killeen, Ypsilanti, MI (US); Ryan C. Harris, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 161 days.

(21) Appl. No.: 18/374,561

(22) Filed: Sep. 28, 2023

(65) Prior Publication Data

US 2025/0108746 A1    Apr. 3, 2025

(51) Int. Cl.
| | |
|---|---|
| *B60R 11/00* | (2006.01) |
| *B60N 3/10* | (2006.01) |
| *B60S 1/64* | (2006.01) |

(52) U.S. Cl.
CPC . *B60N 3/10* (2013.01); *B60S 1/64* (2013.01)

(58) Field of Classification Search
CPC ... B60R 2011/0075; B60R 13/07; B60N 3/10; B60N 3/101; B60N 3/104; Y10S 224/926
USPC ......................................................... 224/926
See application file for complete search history.

(56) References Cited

U.S. PATENT DOCUMENTS

| | | | | |
|---|---|---|---|---|
| 3,842,981 | A | * | 10/1974 | Lambert ............... B60N 3/103 211/74 |
| 5,102,086 | A | * | 4/1992 | Thomason ........... B60N 3/103 248/311.2 |
| 5,669,538 | A | * | 9/1997 | Ward ................. B65D 81/3205 D7/619.1 |
| 5,823,410 | A | * | 10/1998 | Ackeret ............... B60N 3/102 224/281 |
| 7,500,443 | B1 | | 3/2009 | Allen |
| 7,748,678 | B2 | | 7/2010 | Camarota et al. |
| 7,780,212 | B2 | | 8/2010 | Hirata et al. |
| 9,452,716 | B2 | | 9/2016 | Williams et al. |
| 9,630,543 | B2 | | 4/2017 | Oh et al. |
| 9,937,900 | B2 | | 4/2018 | Logli, Jr. et al. |
| 10,081,313 | B1 | | 9/2018 | Ross |

(Continued)

FOREIGN PATENT DOCUMENTS

| | | | | |
|---|---|---|---|---|
| CN | 110576781 A | * | 12/2019 | ............... B60N 3/10 |
| EP | 2269867 A1 | | 1/2011 | |

(Continued)

OTHER PUBLICATIONS

CN-110576781-A Translation (Year: 2019).*

*Primary Examiner* — Adam J Waggenspack
(74) *Attorney, Agent, or Firm* — Snell & Wilmer LLP

(57) ABSTRACT

Apparatuses, systems, and methods include a container receptacle configured to receive a beverage container. The container receptacle includes a perforated bottom surface configured to allow a spilled liquid and/or debris to pass therethrough. A drip tray extends beneath the container receptacle so as to collect the spilled liquid from the container receptacle. A bottom surface of the drip tray can be inclined so that liquid and/or debris is directed to a low point of the drip tray for collection.

20 Claims, 4 Drawing Sheets

(56) References Cited

U.S. PATENT DOCUMENTS

| | | | |
|---|---|---|---|
| 10,106,105 B2 | 10/2018 | Hansen et al. | |
| 10,449,897 B2 * | 10/2019 | Tokunaga | B60Q 3/66 |
| 10,696,205 B2 | 6/2020 | Uhlenbusch et al. | |
| 10,974,635 B1 | 4/2021 | Tiringo et al. | |
| 11,213,119 B1 | 1/2022 | Mohammed | |
| 2010/0230571 A1 * | 9/2010 | Sharkey | B60N 3/108 |
| | | | 248/311.2 |

FOREIGN PATENT DOCUMENTS

| | | |
|---|---|---|
| JP | 2020114702 A | 7/2020 |
| KR | 20130042155 A | 4/2013 |
| KR | 20210132851 A | 11/2021 |

* cited by examiner

APPARATUS, SYSTEM, AND METHOD FOR VEHICLE CUP HOLDER WITH INTEGRATED GRATE AND DRIP TRAY

BACKGROUND

Field

The present disclosure relates to apparatuses, systems, and methods for a cup holder that is mounted inside a vehicle to store and hold a beverage container.

Description of the Related Art

Most vehicles include one or more cup holders for the convenience of driver and/or passenger(s) of the vehicle. The cup holder(s) enhance(s) the ability of the driver to access beverages while operating and/or riding in the vehicle. A cup holder typically includes an enclosed receptacle in which liquid and debris tends to collect. For example, liquid drops such as water droplets that have condensed on the outer surface of the beverage container contained in the cup holder can flow down the beverage container and collect at the bottom of the cup holder. Moreover, liquids such as beverages that have spilled from the beverage container into the holder body due to vibration during traveling or other factors can collect at the bottom of the cup holder.

Accordingly, there is a need for a system and a method for retaining a beverage within a vehicle that is subject to spillage, condensation, or collection of debris.

SUMMARY

In general, one aspect of the subject matter described in this disclosure may be embodied in an apparatus for a vehicle. The apparatus includes a container receptacle configured to receive a beverage container. The container receptacle includes a grate defining a perforated bottom surface of the container receptacle and configured to allow a spilled liquid to pass therethrough. The apparatus further includes a drip tray extending beneath the container receptacle so as to collect the spilled liquid from the container receptacle.

These and other embodiments may optionally include one or more of the following features. The container receptacle can define a central axis. The drip tray can extend radially outward from the container receptacle. An upward facing opening can be defined between a sidewall of the container receptacle and the drip tray whereby a cavity of the drip tray for collecting the spilled liquid is accessible.

The apparatus can further include a lip extending radially outward from the container receptacle. The apparatus can further include an access port disposed in the lip. The access port can be sized and configured to permit a vacuum hose to be inserted through the lip to suck up the spilled liquid from the drip tray. The apparatus can further include a cover disposed at the access port.

A bottom surface of the drip tray can be oriented at an angle with respect to a horizontal plane (i.e., inclined) so that gravity pulls the spilled liquid away from the central axis of the container receptacle to directly beneath the access port.

The apparatus can further include an HVAC drain line coupled to the drip tray, and the HVAC drain line is located so that an HVAC liquid is directed from the HVAC drain line across a bottom surface of the drip tray toward a low point of the bottom surface. The apparatus can further include a drip tray drain line coupled to the drip tray whereby the spilled liquid is directed away from the drip tray to an exterior of the vehicle. The HVAC drain line can be coupled to a high point of the drip tray and the drip tray drain line can be coupled to the low point of the drip tray.

In another aspect, the subject matter may be embodied in a vehicle cup holder. The vehicle cup holder can include a vehicle panel and a container receptacle mounted to the vehicle panel. The container receptacle is configured to receive a beverage container. The container receptacle includes a grate defining a perforated bottom surface of the container receptacle, and the grate is configured to allow a spilled liquid to pass therethrough. The cup holder further includes a drip tray extending beneath the container receptacle so as to collect the spilled liquid from the container receptacle.

These and other embodiments may optionally include one or more of the following features. A bottom surface of the drip tray can be inclined so that gravity pulls the spilled liquid away from the central axis of the container receptacle to directly beneath the access port. The vehicle panel can define an opening configured to receive the container receptacle.

In another aspect, the subject matter may be embodied in a method. The method can include positioning a drip tray to extend beneath a container receptacle, the container receptacle includes a grate defining a perforated bottom surface of the container receptacle and configured to allow a spilled liquid to pass therethrough. The method can further include catching the spilled liquid with the drip tray from the container receptacle. The method can further include directing the spilled liquid with an inclined bottom surface of the drip tray away from a central axis of the container receptacle.

These and other embodiments may optionally include one or more of the following features. The directing the spilled liquid with the inclined surface can include directing the spilled liquid to directly beneath an access port. The directing the spilled liquid with the inclined surface can include directing the spilled liquid to a drip tray drain line coupled to a low point of the drip tray. The method can further include flushing the drip tray with an HVAC liquid received from an HVAC drain line.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

The present disclosure describes apparatuses, systems, and methods for vehicle article holders, such as a cup holder for example, including a drip tray for collecting liquid and/or debris out of sight of a user. For instance, an apparatus includes a container receptacle and a drip tray disposed beneath the container receptacle. The container receptacle is configured to receive an article, such as a beverage container. The container receptacle includes a perforated bottom surface configured to allow a spilled liquid and/or debris to pass therethrough. The drip tray extends beneath the container receptacle so as to collect the spilled liquid and/or debris from the container receptacle. Accordingly, the apparatus allows for liquid and debris to accumulate below a vehicle cup holder and out of sight of the user, resulting in a cleaner appearance within the cup holder.

A bottom surface of the drip tray can be inclined so that liquid and/or debris is directed to a low point of the drip tray. The collected liquid and/or debris can then be directed away from the drip tray to an exterior of the vehicle by a drain line, in accordance with various embodiments. The collected liquid and/or debris can then be sucked up (e.g., via a vacuum hose) from the drip tray via an access port located above the drip tray, in accordance with various embodiments. By including a perforated surface (e.g., a grate) at the bottom of the container receptacle, spilled liquid and condensation is permitted to flow below the cup holder and out of sight of the user. In embodiments, an upper end of the cup holder lower panel is connected to a water drainage port of the vehicle HVAC system (i.e., evaporator/condenser). Water from the HVAC system flows onto the cup holder lower panel to flush liquids and debris into a drainage port that is connected to the exterior of the vehicle. Moreover, a plurality of cup holder drip trays can be connected in a network whereby spillage and/or condensation from multiple cup holders is directed to a single location whereby the spillage can be removed.

Figure 1:
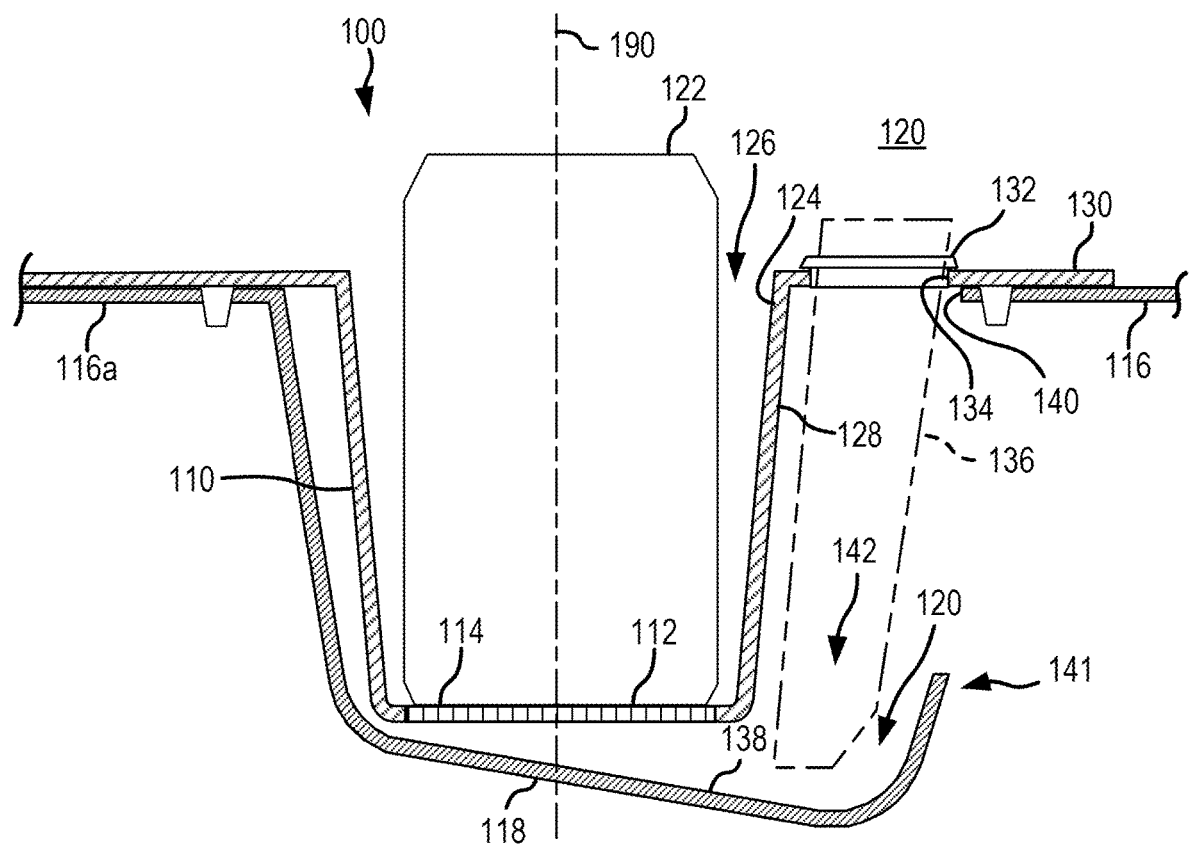
FIG. 1 is a schematic section view of a vehicle cup holder apparatus including a drip tray according to an embodiment of the present disclosure.

Referring to the drawings, wherein like reference numbers correspond to like or similar components throughout the several figures, FIG. 1 generally shows an apparatus 100 for a vehicle including a container receptacle 110 (also referred to as a cup holder) having a grate 112 defining a perforated bottom surface 114 of the container receptacle 110 configured to provide a path to allow for liquid and debris to pass through the perforated bottom surface 114 of the container receptacle 110 and out of sight of a user, resulting in a cleaner appearance within the container receptacle 110.

The container receptacle 110 can be mounted to, or be part of, a vehicle panel 116. The vehicle panel 116 can be part of a vehicle dash, console, door panel, seat, or any other vehicle panel suitable where it may be desirable to locate a cup holder. The vehicle panel 116 can be an interior vehicle panel, for example located within a cabin of the vehicle.

The apparatus 100 further includes a drip tray 118 at least partially located beneath the grate 112 so as to catch the liquid and/or debris from the grate 112 of the container receptacle 110. In various embodiments, the liquid and/or debris can accumulate below the container receptacle 110 in the drip tray 118. In this regard, the drip tray 118 can be sized and dimensioned to fit beneath the container receptacle 110 and to define a volume for retaining liquid and/or debris. For example, the drip tray 118 can form a reservoir or cavity 120 defining a volume for collecting the liquid and/or debris. The volume can be greater than a predetermined volume of liquid and/or debris so as to help minimize splashing or sloshing of liquid when the vehicle is in motion. The drip tray 118 can be mounted to the container receptacle 110. The drip tray 118 can be mounted to the vehicle panel 116. An opening 140 can be disposed in the vehicle panel 116. The container receptacle 110 can extend through the opening 140. In various embodiments, the drip tray 118 is integrally (e.g., monolithically) coupled to the vehicle panel (e.g., at vehicle panel 116a). In various embodiments, the drip tray 118 is removably coupled to the vehicle panel 116a. In various embodiments, the vehicle panel 116a is part of the drip tray 118 whereby the drip tray 118 is mounted to the container receptacle 110.

The container receptacle 110 can be configured to receive and/or secure an article, such as a beverage container 122 (e.g., a cup, a can, a mug, a bottle, or the like), in a moving vehicle. The container receptacle 110 includes a main body 124. The main body 124 can define a generally cylindrical recess (i.e., cavity) 126. The main body 124 may define any number of recesses in any suitable shape depending on the desired application.

The main body 124 can include the bottom surface 114 and one or more sidewalls 128 extending from the bottom surface 114. The main body 124 can define a central axis 190. The central axis 190 can extend substantially vertically when the container receptacle 110 is installed in the vehicle as it is desirable to hold the beverage container 122 upright in the container receptacle 110.

In various embodiments, the apparatus 100 further includes a lip 130 extending radially outward from the container receptacle 110. The lip 130 can extend from an upper end of the container receptacle 110. The lip 130 can be integrally coupled with the container receptacle 110 (e.g., as a monolithic structure). The lip 130 can be integrally coupled with the vehicle panel 116 (e.g., as a monolithic structure). An access port 134 can be disposed in the lip 130 so as to provide access to the drip tray 118. A cover 132 can be disposed at the access port 134. The cover 132 can be removably coupled to the lip 130 so as to provide access to the drip tray 118 by a user while the container receptacle 110 remains in the installed position. The cover 132 can be a slotted grommet or flap so as to bend or flex to provide access to the drip tray 118 by a user while the cover 132 remains installed to the lip 130. The access port 134 can be an aperture disposed in the lip 130. The access port 134 can be disposed adjacent the container receptacle 110 (i.e., radially offset from the container receptacle 110, with reference to axis 190). The drip tray 118 can extend at least partially under the access port 134. In this manner, a user can insert a vacuum nozzle 136 or other device through the access port 134 into the cavity 120 for removing liquid and/or debris from the drip tray 118. The access port 134 can be sized and dimensioned to receive the vacuum nozzle 136.

In various embodiments, the drip tray 118 is a gravity-assisted drip tray. A bottom surface 138 of the cavity 120 of the drip tray 118 can be angled so that liquid and/or debris collects below the access port 134. For example, assuming gravitational force is directed vertically downward, the bottom surface 138 can be at a non-zero angle with respect to the horizontal plane so that gravity pulls the fluid/debris away from the central axis 190 of the container receptacle 110 to directly beneath the access port 134. In various embodiments, the bottom surface 138 is at a non-perpendicular angle with respect to the central axis 190. Stated differently, the bottom surface 138 is inclined. The bottom surface 138 can be spaced apart from the container receptacle 110.

In various embodiments, the drip tray 118 is coupled to the container receptacle 110 and/or the vehicle panel 116 at a location opposite the container receptacle 110 from the access port 134. A free end 141 of the drip tray 118 can extend under and past the container receptacle 110. The free end 141 and the container receptacle 110 can define an opening 142 to the cavity 120 whereby the vacuum nozzle 136 can reach the cavity 120. The opening 142 can be an upward facing opening (i.e., facing the access port 134). The opening 142 can be defined between the free end 141 of the drip tray 118 and the sidewall 128 of the container receptacle 110.

Figure 2:
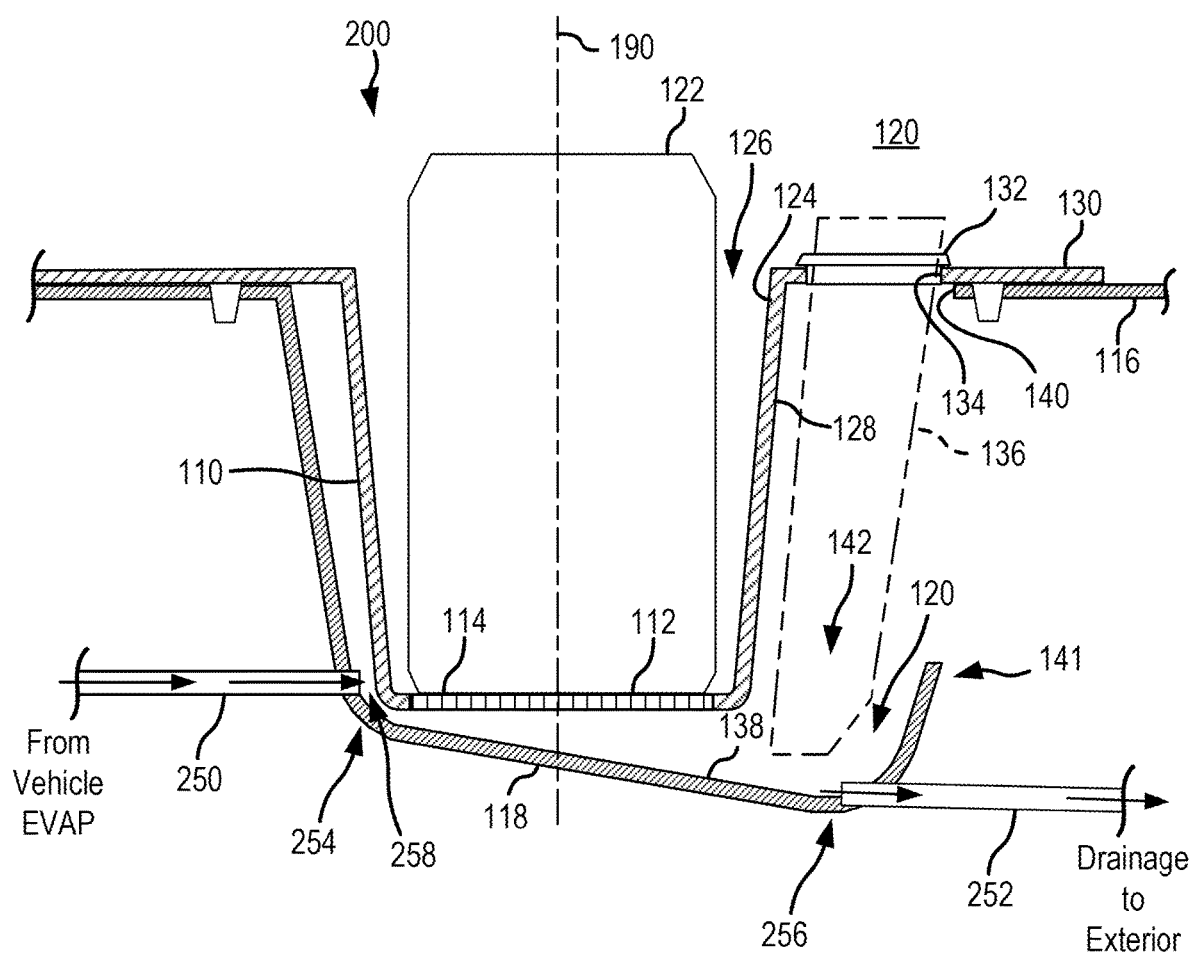
FIG. 2 is a schematic section view of a vehicle cup holder apparatus including a drip tray and further including an HVAC drain line coupled to the drip tray according to an embodiment of the present disclosure.

FIG. 2 shows an apparatus 200 that is similar to apparatus 100 of FIG. 1, but that further includes a vehicle HVAC drain line 250 that drains into the cavity 120. With respect to FIG. 2, elements with like element numbering, as depicted in FIG. 1, are intended to be the same and will not necessarily be repeated for the sake of clarity. The HVAC drain line 250 can be connected to a drainage port of the vehicle's HVAC system (e.g., evaporator/condenser). The HVAC drain line 250 can be coupled to the drip tray 118 and in fluid communication with the cavity 120. Accordingly, a liquid (e.g., water) can drain from the vehicle HVAC system through the HVAC drain line 250 into the drip tray 118.

A drain line 252 (also referred to herein as a drip tray drain line) can be coupled to the drip tray 118 and in fluid communication with cavity 120. Accordingly, liquid collected by the drip tray 118 can drain into the drain line 252 and directed to an exterior of the vehicle. The drain line 252 can be gravity-assisted. In various embodiments, an outlet of the HVAC drain line 250 is coupled to a high point 254 of the drip tray 118. In various embodiments, an inlet of the drain line 252 is coupled to a low point 256 of the drip tray 118. Accordingly, liquid exiting the HVAC drain line 250 can run across the bottom surface 138 of the drip tray 118 and into the drain line 252, such that the liquid cleans and/or flushes the bottom surface 138 as it travels from the HVAC drain line 250 to the drain line 252. Stated differently, the HVAC liquid can flow onto the drip tray 118 to flush liquid and/or debris toward the low point 256 where the liquid and/or debris can be directed to the exterior of the vehicle by the drain line 252 and/or can be sucked up and away by the vacuum nozzle 136. The low point 256 can be a rear end of the drip tray 118, where the rear direction is toward the rear of the vehicle when the apparatus 200 is in an installed position.

By coupling the HVAC drain line 250 to the drip tray 118, an access point 258 is created for servicing the HVAC system, for example whereby the HVAC system can be reverse flushed. For example, the container receptacle 110 can be removed to provide ample access to the access point 258 when servicing the HVAC system.

Figure 3:
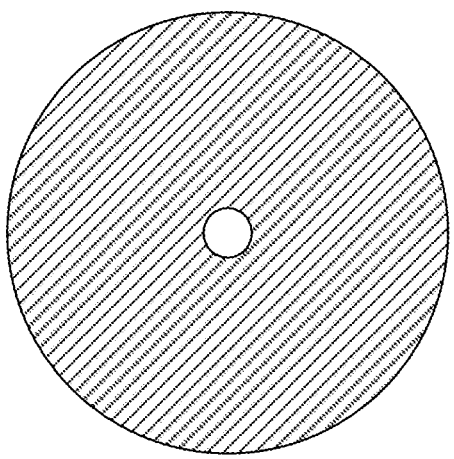
FIG. 3 is a schematic view of a bottom surface of a container receptacle including a perforation according to an embodiment of the present disclosure.

FIG. 3 schematically illustrates a grate 312 having a perforated surface defining an aperture. The grate 312 can be monolithically formed with a container receptacle or can be installed as a separate piece from the container receptacle.

Figure 4:
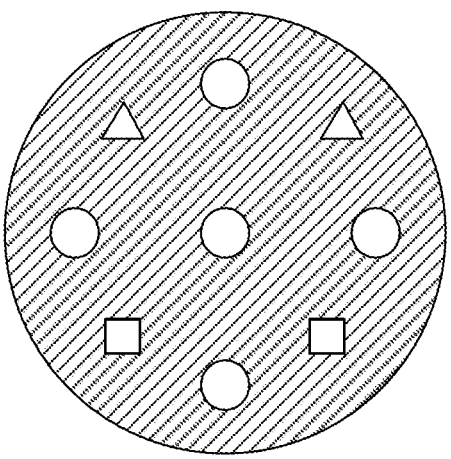
FIG. 4 is a schematic view of a bottom surface of a container receptacle including a plurality of perforations according to an embodiment of the present disclosure.

FIG. 4 schematically illustrates a grate 412 having a perforated surface defining a plurality of apertures. The grate 412 can be monolithically formed with a container receptacle or can be installed as a separate piece from the container receptacle.

Figure 5:
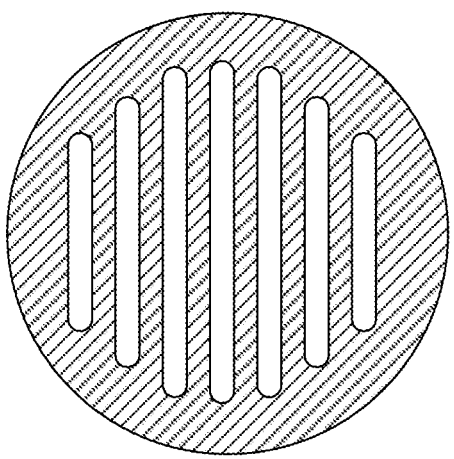
FIG. 5 is a schematic view of a bottom surface of a container receptacle including a plurality of elongated perforations according to an embodiment of the present disclosure.

FIG. 5 schematically illustrates a grate 512 having a perforated surface defining a plurality of elongated apertures or slots. The grate 512 can be monolithically formed with a container receptacle or can be installed as a separate piece from the container receptacle.

Figure 6:
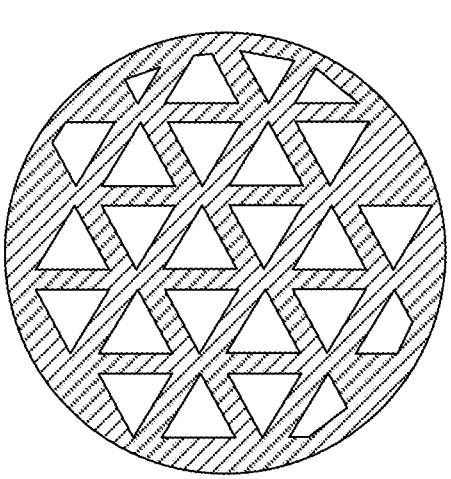
FIG. 6 is a schematic view of a bottom surface of a container receptacle including an array of perforations according to an embodiment of the present disclosure.

FIG. 6 schematically illustrates a grate 612 having a perforated surface defining a plurality of apertures arranged in a grid pattern. The grate 612 can be monolithically formed with a container receptacle or can be installed as a separate piece from the container receptacle.

The grate 112 of FIG. 1 can be similar to any of the grates illustrated in FIG. 3 through FIG. 6.

Figure 7:
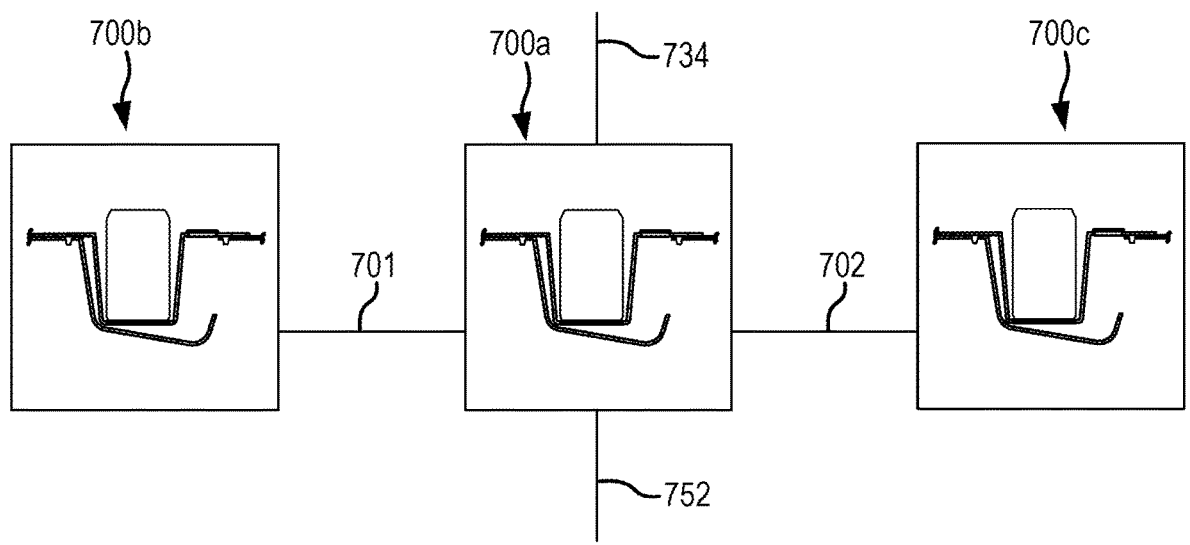
FIG. 7 is a schematic view of a network of vehicle cup holder apparatus in fluid communication with one another according to an embodiment of the present disclosure.

FIG. 7 shows a network of apparatus (e.g., apparatus 700a, apparatus 700b, and apparatus 700c) fluidly coupled in a network. Each apparatus 700a, 700b, and 700c can be similar to apparatus 100 (see FIG. 1) or apparatus 200 (see FIG. 2). Apparatus 700b can drain into apparatus 700a via a first drain line 701. Apparatus 700c can drain into apparatus 700a via a second drain line 702. Accordingly, apparatus 700a can collect liquid from apparatus 700a, apparatus 700b, and apparatus 700c. Apparatus 700a can be equipped with an access port 734 (e.g., similar to access port 134 of FIG. 1) whereby the collected liquid can be removed from the apparatus 700a. Apparatus 700a can be equipped with a drain line 752 (E.g., similar to drain line 252 of FIG. 2) whereby collected liquid is directed to the vehicle exterior. In this manner, a plurality of vehicle cup holders can be fluidly coupled to direct liquid spillage to a single extraction point.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for a vehicle, the apparatus comprising:
   a container receptacle configured to receive a beverage container, the container receptacle includes a grate defining a perforated bottom surface of the container receptacle and configured to allow a spilled liquid to pass therethrough;

a drip tray extending beneath the container receptacle so as to collect the spilled liquid from the container receptacle;

a lip extending radially outward from the container receptacle; and an access port disposed in the lip so as to provide access to the drip tray.

2. The apparatus of claim 1, wherein the container receptacle defines a central axis, the drip tray extends radially outward from the container receptacle, and an upward facing opening is defined between a sidewall of the container receptacle and the drip tray whereby a cavity of the drip tray for collecting the spilled liquid is accessible.

3. The apparatus of claim 2, wherein the access port is sized and configured to permit a vacuum hose to be inserted through the lip to suck up the spilled liquid from the drip tray.

4. The apparatus of claim 2, wherein a bottom surface of the drip tray is oriented at an angle with respect to a horizontal plane so that gravity pulls the spilled liquid away from the central axis of the container receptacle to directly beneath the access port.

5. The apparatus of claim 4, further comprising a cover disposed at the access port.

6. The apparatus of claim 1, further comprising an HVAC drain line coupled to the drip tray, and the HVAC drain line is located so that an HVAC liquid is directed from the HVAC drain line across a bottom surface of the drip tray toward a low point of the bottom surface.

7. The apparatus of claim 1, further comprising a drip tray drain line coupled to the drip tray whereby the spilled liquid is directed away from the drip tray to an exterior of the vehicle.

8. A vehicle cup holder, comprising:
a vehicle panel;
a container receptacle configured to receive a beverage container, the container receptacle is mounted to the vehicle panel, the container receptacle includes a grate defining a perforated bottom surface of the container receptacle, and the grate is configured to allow a spilled liquid to pass therethrough;
a drip tray extending beneath the container receptacle so as to collect the spilled liquid from the container receptacle;
a lip extending radially outward from the container receptacle; and
an access port disposed in the lip so as to provide access to the drip tray.

9. The vehicle cup holder of claim 8, wherein the container receptacle defines a central axis, the drip tray extends radially outward from the container receptacle, and an upward facing opening is defined between a sidewall of the container receptacle and the drip tray whereby a cavity of the drip tray for collecting the spilled liquid is accessible.

10. The vehicle cup holder of claim 9, wherein a bottom surface of the drip tray is inclined so that gravity pulls the spilled liquid away from the central axis of the container receptacle to directly beneath the access port.

11. The vehicle cup holder of claim 10, wherein the access port is sized and dimensioned to receive a vacuum nozzle therethrough.

12. The vehicle cup holder of claim 9, wherein the vehicle panel defines an opening configured to receive the container receptacle.

13. The vehicle cup holder of claim 10, further comprising an HVAC drain line coupled to the drip tray, whereby the drip tray is further configured to collect an HVAC liquid from the HVAC drain line.

14. The vehicle cup holder of claim 13, further comprising a drip tray drain line coupled to the drip tray, whereby at least one of the spilled liquid and the HVAC liquid is directed away from the drip tray.

15. The vehicle cup holder of claim 14, wherein the HVAC drain line is coupled to a high point of the drip tray and the drip tray drain line is coupled to a low point of the drip tray.

16. A method comprising:
positioning a drip tray to extend beneath a container receptacle, the container receptacle includes a grate defining a perforated bottom surface of the container receptacle and configured to allow a spilled liquid to pass therethrough;
catching the spilled liquid with the drip tray from the container receptacle;
directing the spilled liquid with an inclined bottom surface of the drip tray away from a central axis of the container receptacle; and
flushing the drip tray with an HVAC liquid received from an HVAC drain line.

17. The method of claim 16, wherein the directing the spilled liquid with the inclined surface includes directing the spilled liquid to directly beneath an access port.

18. The method of claim 16, wherein the directing the spilled liquid with the inclined surface includes directing the spilled liquid to a drip tray drain line coupled to a low point of the drip tray.

19. An apparatus for a vehicle, the apparatus comprising:
a container receptacle configured to receive a beverage container, the container receptacle includes a grate defining a perforated bottom surface of the container receptacle and configured to allow a spilled liquid to pass therethrough;
a drip tray extending beneath the container receptacle so as to collect the spilled liquid from the container receptacle; and
an HVAC drain line coupled to the drip tray, and the HVAC drain line is located so that an HVAC liquid is directed from the HVAC drain line across a bottom surface of the drip tray toward a low point of the bottom surface.

20. The apparatus of claim 19, further comprising a drip tray drain line coupled to the drip tray, whereby at least one of the spilled liquid and the HVAC liquid is configured to be directed away from the drip tray.

* * * * *